(12) United States Patent
Ito et al.

(10) Patent No.: US 10,292,460 B2
(45) Date of Patent: May 21, 2019

(54) FASTENER MEMBER, FASTENER STRUCTURE, AND SUPPORT MEMBER

(71) Applicant: 3M INNOVATIVE PROPERTIES COMPANY, St. Paul, MN (US)

(72) Inventors: Akira Ito, Tokyo (JP); Shuhei Nisogi, Tokyo (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 852 days.

(21) Appl. No.: 14/890,621

(22) PCT Filed: May 15, 2014

(86) PCT No.: PCT/US2014/038107
§ 371 (c)(1),
(2) Date: Nov. 12, 2015

(87) PCT Pub. No.: WO2014/186528
PCT Pub. Date: Nov. 20, 2014

(65) Prior Publication Data
US 2016/0073742 A1 Mar. 17, 2016

(30) Foreign Application Priority Data

May 16, 2013 (JP) ................................. 2013-104208

(51) Int. Cl.
*A44B 18/00* (2006.01)
*F16B 5/07* (2006.01)
(52) U.S. Cl.
CPC ............ *A44B 18/0073* (2013.01); *F16B 5/07* (2013.01)
(58) Field of Classification Search
CPC . A44B 18/00; A44B 18/0046; A44B 18/0048; A44B 18/0073; A47H 1/04; A47H 1/104; A47H 13/00
See application file for complete search history.

(56) References Cited

U.S. PATENT DOCUMENTS 5,678,286 A * 10/1997 Murasaki ........... A44B 18/0046
24/444
6,254,304 B1 * 7/2001 Takizawa ........... A44B 18/0046
24/444
(Continued)

FOREIGN PATENT DOCUMENTS

| JP | H06-7208 | 1/1994 |
| JP | H06-64591 | 9/1994 |

(Continued)

OTHER PUBLICATIONS

International Search Report for PCT International Application No. PCT/US2014/038107, dated Sep. 26, 2014, 4 pages.

*Primary Examiner* — Daniel J Wiley
(74) *Attorney, Agent, or Firm* — Harold C. Knecht, III

(57) ABSTRACT

The inventive fastener member, fastener structure, and support member can reduce rattling and noise without reducing the ease of assembly. The fastener member 10 includes guided portions 12A, 12B that are guided in the mounting direction D1 by guide portions 22A, 22B. Elastically deforming portions 30A, 30B formed on the guided portions 12A, 12B can elastically deform in a direction that intersects with the mounting direction D 1. When the fastener member 10 is mounted, the elastically deforming portions 30A, 30B deform elastically, so it can be easily assembled without interference between the guide portions 22A, 22B and the guided portions 12A, 12B. After it is mounted, the fastener member 10 is supported without play by the guide portions 22A, 22B of the support member 20 due to the elastic force generated between the elastically deforming portions 30A, 30B and the receiving portions 40A, 40B.

20 Claims, 11 Drawing Sheets

(56) References Cited

U.S. PATENT DOCUMENTS

| | | | |
|---|---|---|---|
| 6,463,634 B1 * | 10/2002 | Naohara | A44B 18/0049 24/306 |
| 7,904,994 B2 | 3/2011 | Girodo et al. | |
| 2015/0101156 A1 | 4/2015 | Sachee et al. | |

FOREIGN PATENT DOCUMENTS

| | | |
|---|---|---|
| JP | H08-154811 | 6/1996 |
| JP | H0923907 | 1/1997 |
| JP | 2004-169828 | 6/2004 |
| JP | 2009-100871 | 5/2009 |
| JP | 4954017 | 6/2012 |

* cited by examiner

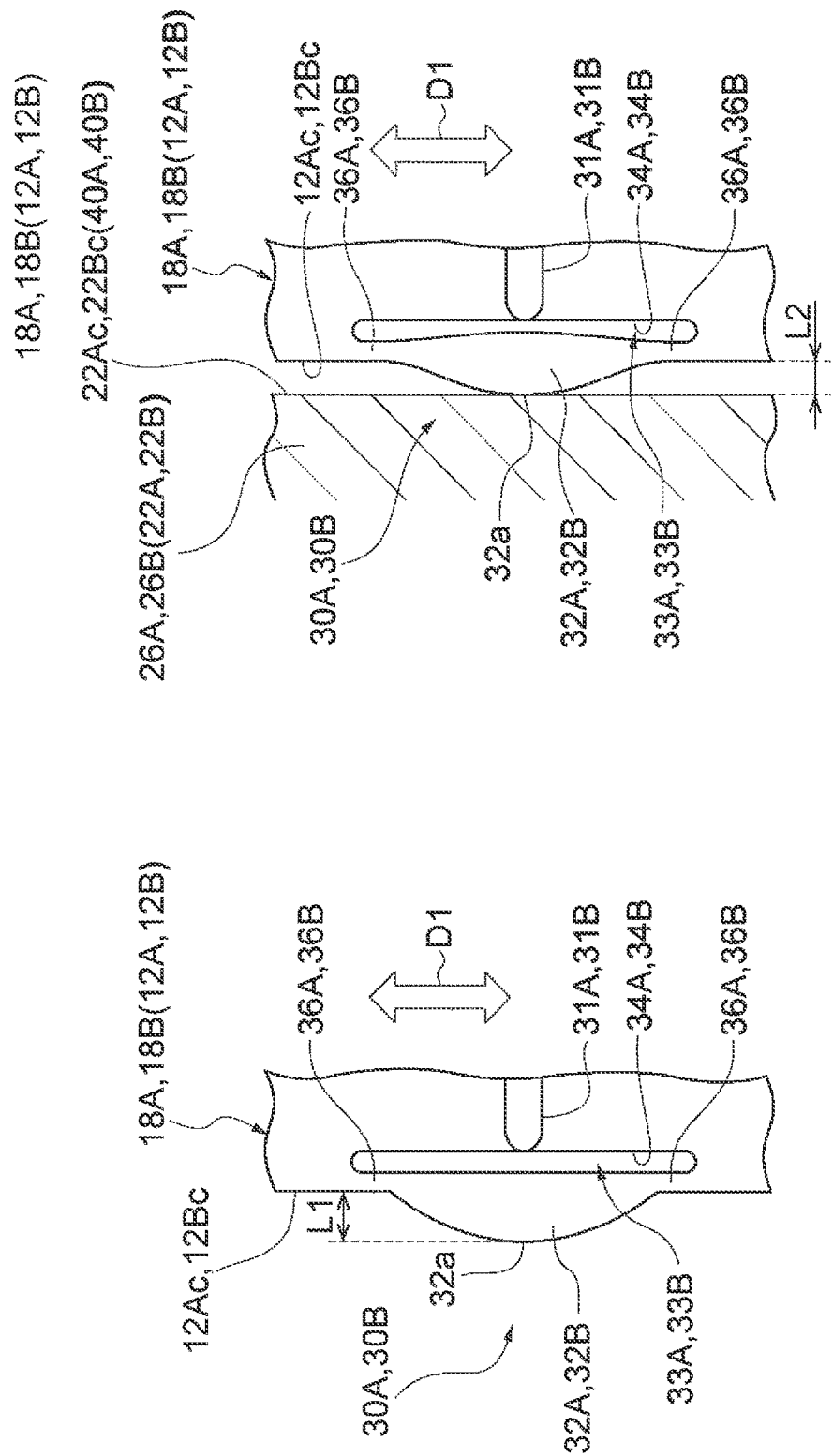

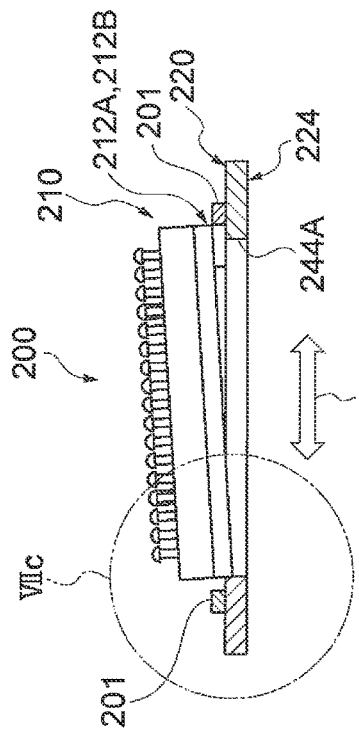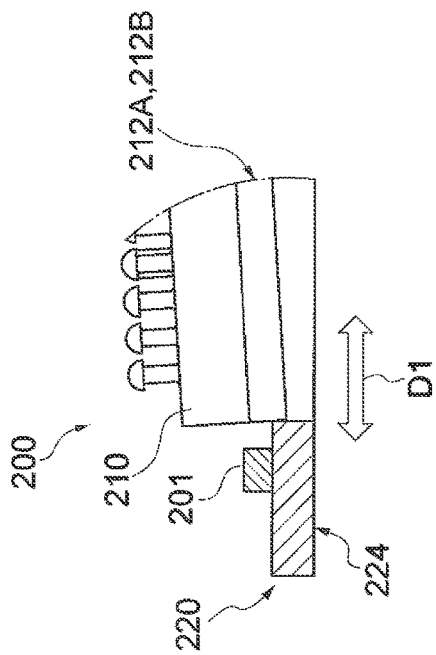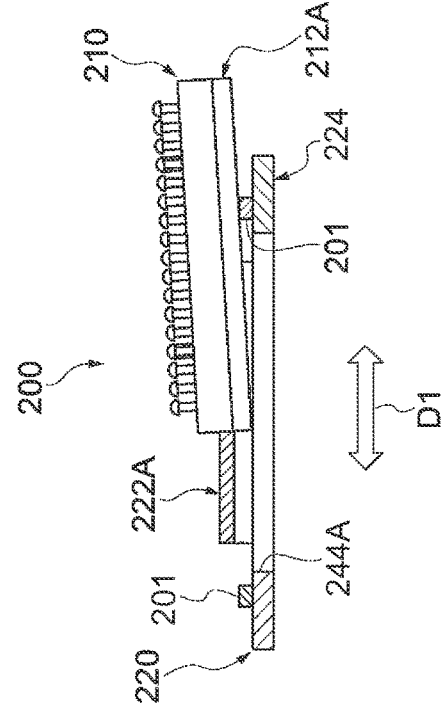

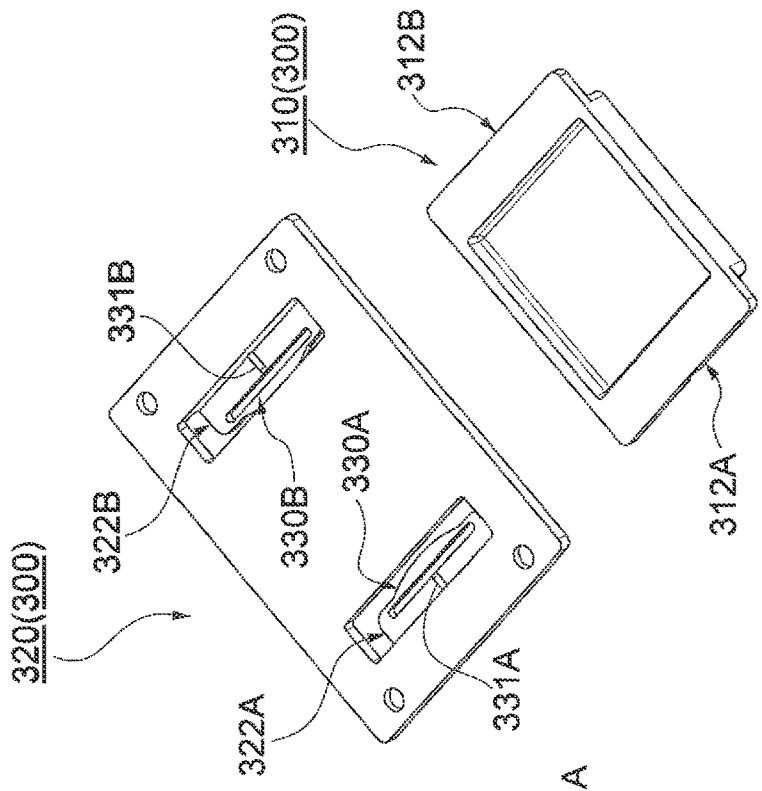
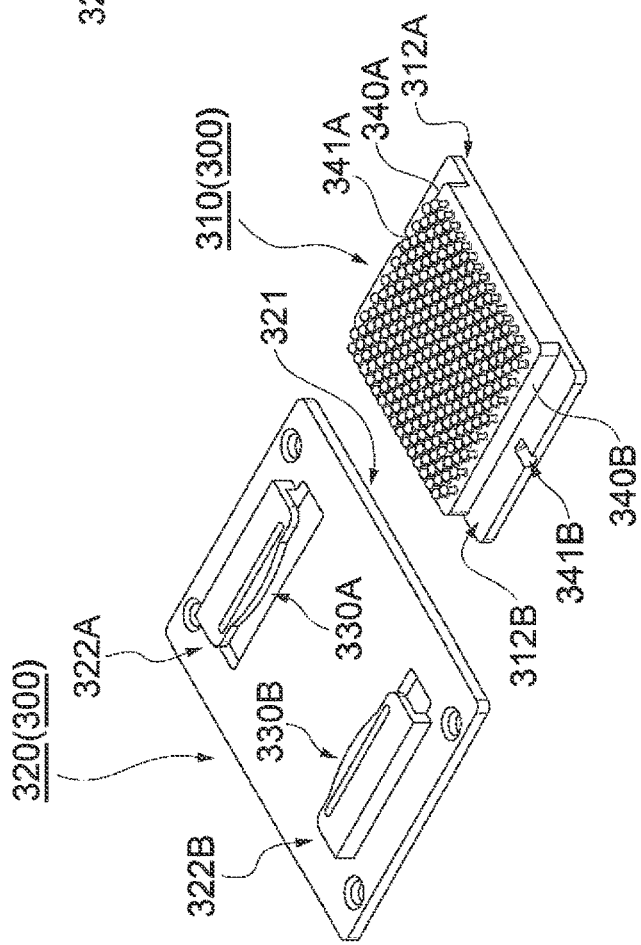
FIG. 8b
FIG. 8a

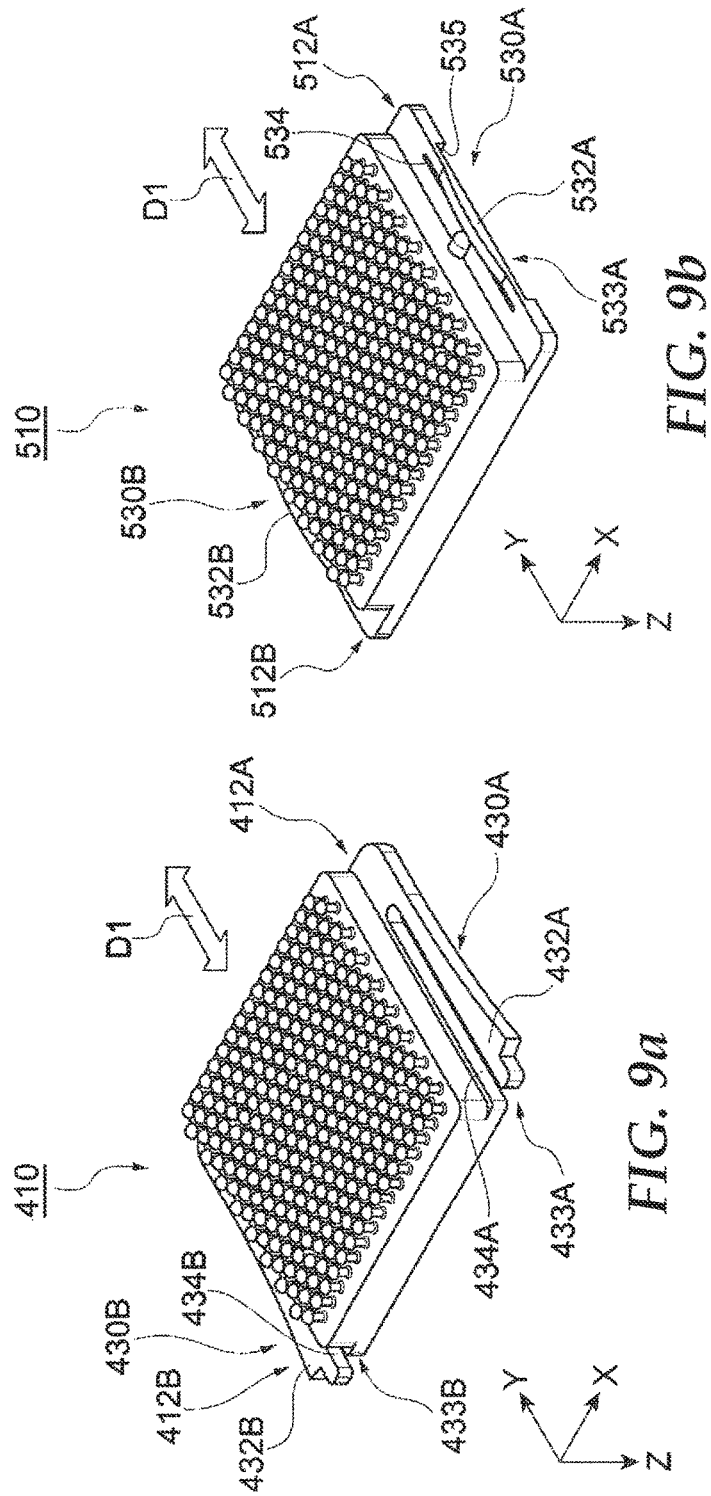

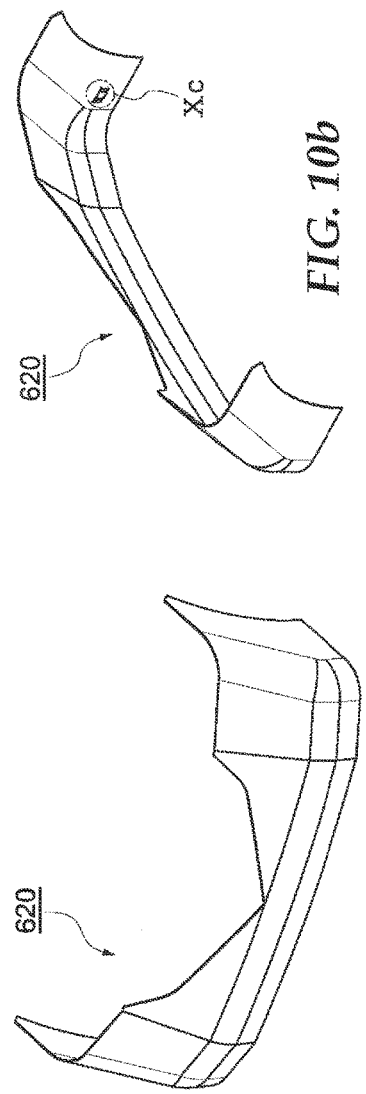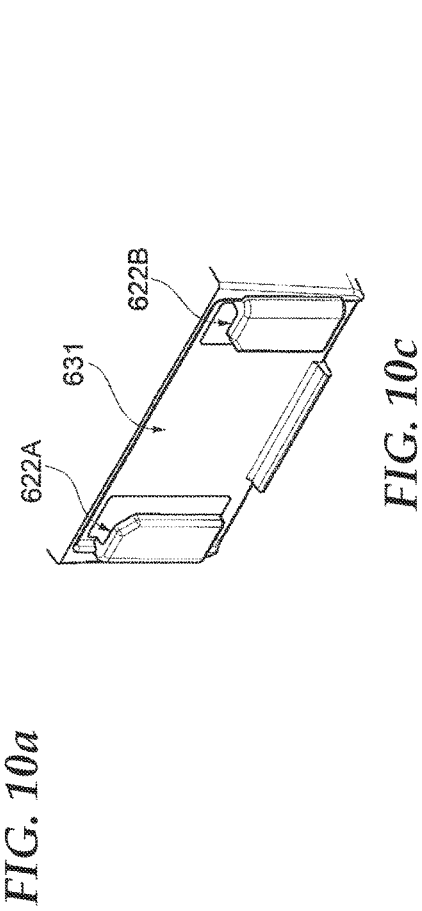
FIG. 10b
FIG. 10c
FIG. 10a

FASTENER MEMBER, FASTENER STRUCTURE, AND SUPPORT MEMBER

CROSS REFERENCE TO RELATED APPLICATIONS

This application is a national stage filing under 35 U.S.C. 371 of PCT/US2014/038107 filed May 15, 2014, which claims priority to JP Application No. 2013-104208, filed May 16, 2013, the disclosures of which are incorporated by reference in their entireties herein.

FIELD OF THE INVENTION

One aspect of the present invention relates to a fastener member, fastener structure, and support member.

BACKGROUND

Conventionally, a structure is known in which a fastener member that can be coupled to a first member is mounted on a separate support member that is fixed to a second member.

For example, in Japanese Unexamined Patent Application Publication No. 2009-100871, a structure is disclosed in which L-shaped hooks that support a fastener are provided on a bracket for fastening and fixing vehicle interior finishing material or vehicle interior finishing ceiling, and a fastener configured by providing a plurality of fastening members on a plate member is slid into and sandwiched between the hooks of the bracket.

SUMMARY OF THE INVENTION

In the present invention, a fastener member is supported on a separate support member by a guide portion. Therefore, the problem occurs that if there is a gap between the fastener member and the guide portion, rattling can occur between the fastener member and the support member. Also, the problem occurs that noise is generated by vibrations or the like when a vehicle is moving, due to the rattling. On the other hand, when the gap between the fastener member and the guide portion is too small, it is difficult to mount the fastener member on the support member, which produces the problem that the operability of assembly is reduced. From the above, there is a demand for a fastener member, a fastener structure, and a support member that can reduce rattling and noise without reducing the ease of assembly.

A fastener member according to one aspect of the present invention is mechanically coupled to a second member that is to be mounted on a first member, and is fixed to the first member via a support member, the fastener member comprising: a fastener portion that includes a substrate that includes a surface, and an engaging member vertically provided on the surface, and that is mechanically coupled to the second member by engaging the engaging member with the second member; and a guided portion provided on the edge portion of the substrate, that is guided in the mounting direction when mounted on the support member, wherein an elastically deforming portion that can elastically deform in a direction that intersects with the mounting direction is formed on the guided portion.

According to this aspect, the fastener member can include a guided portion provided on the edge of the substrate that is guided in the mounting direction when mounted on the support member. An elastically deforming portion that can elastically deform in a direction that intersects with the mounting direction is formed on the guided portion. Therefore, to mount the fastener member on the support member, when the guided portion of the fastener member is guided by the guide portion of the support member, the elastically deforming portion formed on the guided portion contacts the guide portion of the support member, so it can elastically deform in a direction that intersects with the mounting direction. When the fastener member is mounted, the elastically deforming portion deforms elastically, so it can be easily assembled without interference between the guide portion and the guided portion. On the other hand, after the fastener member is mounted, the fastener member is supported without rattling by the guide portion of the support member due to the elastic force of the elastically deforming portion. As a result of the above, it is possible to reduce rattling and suppress noise without reducing the ease of assembly.

In a fastener member according to another aspect, a protruding portion that projects in a direction that intersects with the mounting direction or a projection receiving portion that is depressed in a direction that intersects with the mounting direction may be formed in the guided portion.

Also, in a fastener member according to another aspect, the elastically deforming portion includes an outward extending portion that extends along the edge in the mounting direction of the guided portion, and a deformation accommodating portion that allows deformation of the outward extending portion to the inside by forming a space extending in the mounting direction to the inside of the outward extending portion.

A fastener structure according to one aspect of the present invention includes a fastener member that is mechanically coupled to a second member that is to be mounted on a first member, and a support member on which the fastener member can be mounted, and that is fixed to the first member, wherein the fastener member includes a fastener portion that includes a substrate that includes a surface, and an engaging member vertically provided on the surface, and that is mechanically coupled to the second member by engaging the engaging member with the second member, and a guided portion provided on the edge portion of the substrate, that is guided in the mounting direction when mounted on the support member, the support member includes a base that supports the substrate of the fastener member, and a guide portion provided on the base, that guides the guided portion of the fastener member in the mounting direction, wherein an elastically deforming portion that can elastically deform in a direction that intersects with the mounting direction is formed on the guided portion, and a receiving portion that receives elastic force from the elastically deforming portion is formed on the guide portion, or, an elastically deforming portion that can elastically deform in a direction that intersects with the mounting direction is formed on the guide portion, and a receiving portion that receives elastic force from the elastically deforming portion is formed on the guided portion.

In a fastener structure according to another aspect, a protruding portion that projects in a direction that intersects with the mounting direction may be formed in the guided portion, a projection receiving portion that accommodates the protruding portion may be formed in the guide portion as a depression in a direction that intersects with the mounting direction, or, a protruding portion that projects in a direction that intersects with the mounting direction may be formed in the guide portion, and a projection receiving portion that accommodates the protruding portion may be formed in the guided portion in a direction that intersects with the mounting direction.

In a fastener structure according to another aspect, the support member may be configured from a vehicle structure.

A fastener structure according to one aspect of the present invention is a support member on which is fixed a fastener member that is mechanically coupled to a second member that is to be mounted on a first member, and that is fixed to the first member, the support member including: a base that supports the fastener member, and a guide portion provided on the base, that guides the fastener member in the mounting direction, and an elastically deforming portion that can elastically deform in a direction that intersects with the mounting direction being formed on the guide portion.

According to one aspect of the present invention, it is possible to reduce rattling and suppress noise without reducing the ease of assembly.

BRIEF DESCRIPTION OF THE DRAWINGS

FIG. 4 shows an elastically deforming portion viewed from above;

FIG. 7 shows the fastener member according to the comparative example being mounted on the support member;

FIG. 8 is a perspective view of the fastener structure according to a modified example;

FIG. 9 is a perspective view of the fastener member according to modified examples;

FIG. 10 shows a support member according to a modified example; and

DETAILED DESCRIPTION OF ILLUSTRATIVE EMBODIMENTS

Figure 1:
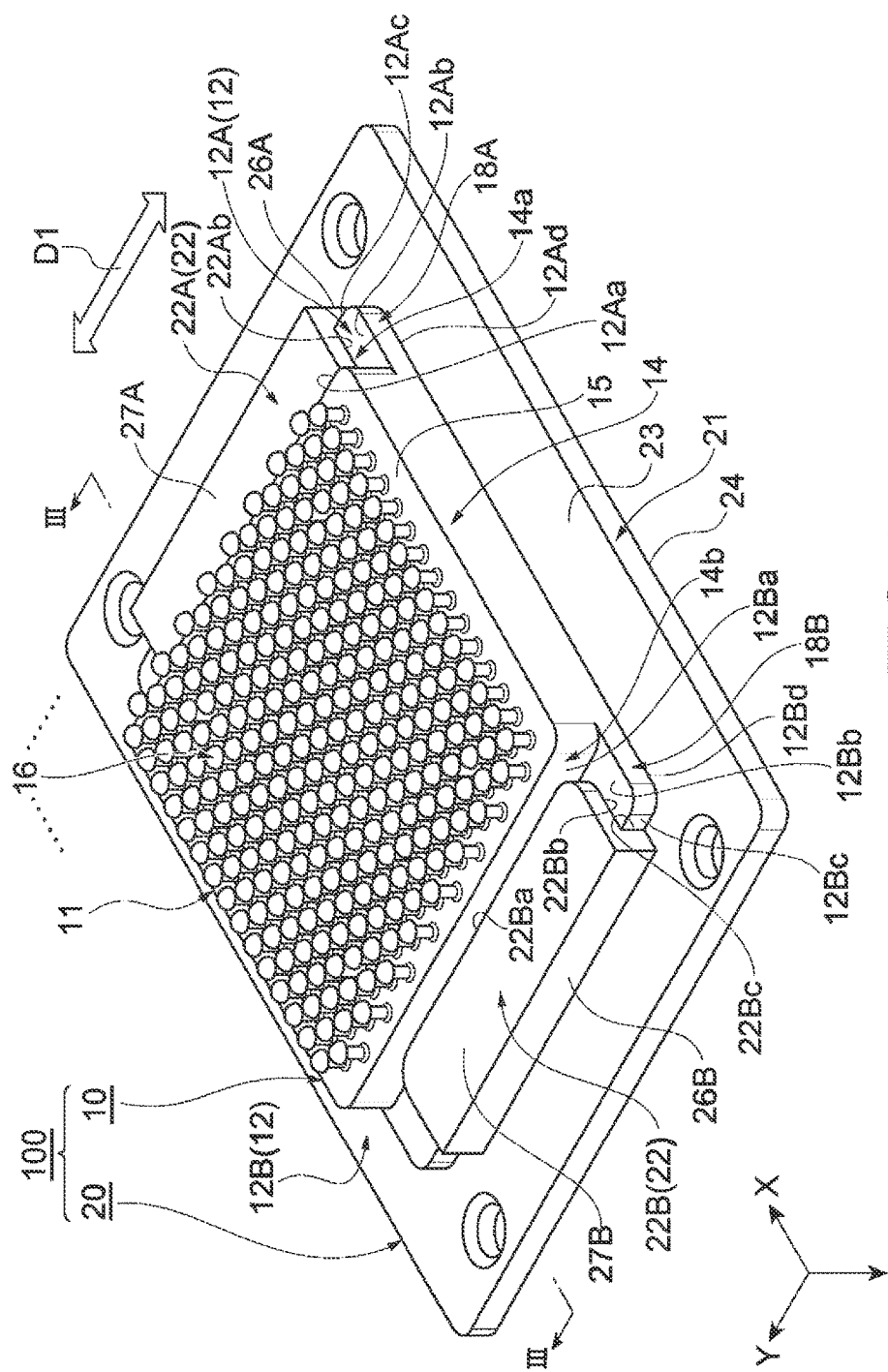
FIG. 1 is a perspective view showing a fastener structure in which a fastener member is mounted on a support member according to one embodiment.

Embodiments of the present invention will now be described in greater detail below with reference to the attached drawings. In the following description, the same or the equivalent elements are given the same reference number, and duplicate descriptions are omitted. Also, the terms "X direction", "Y direction", and "Z direction" are for descriptive purposes and are based on directions shown in the drawings.

Figure 2:
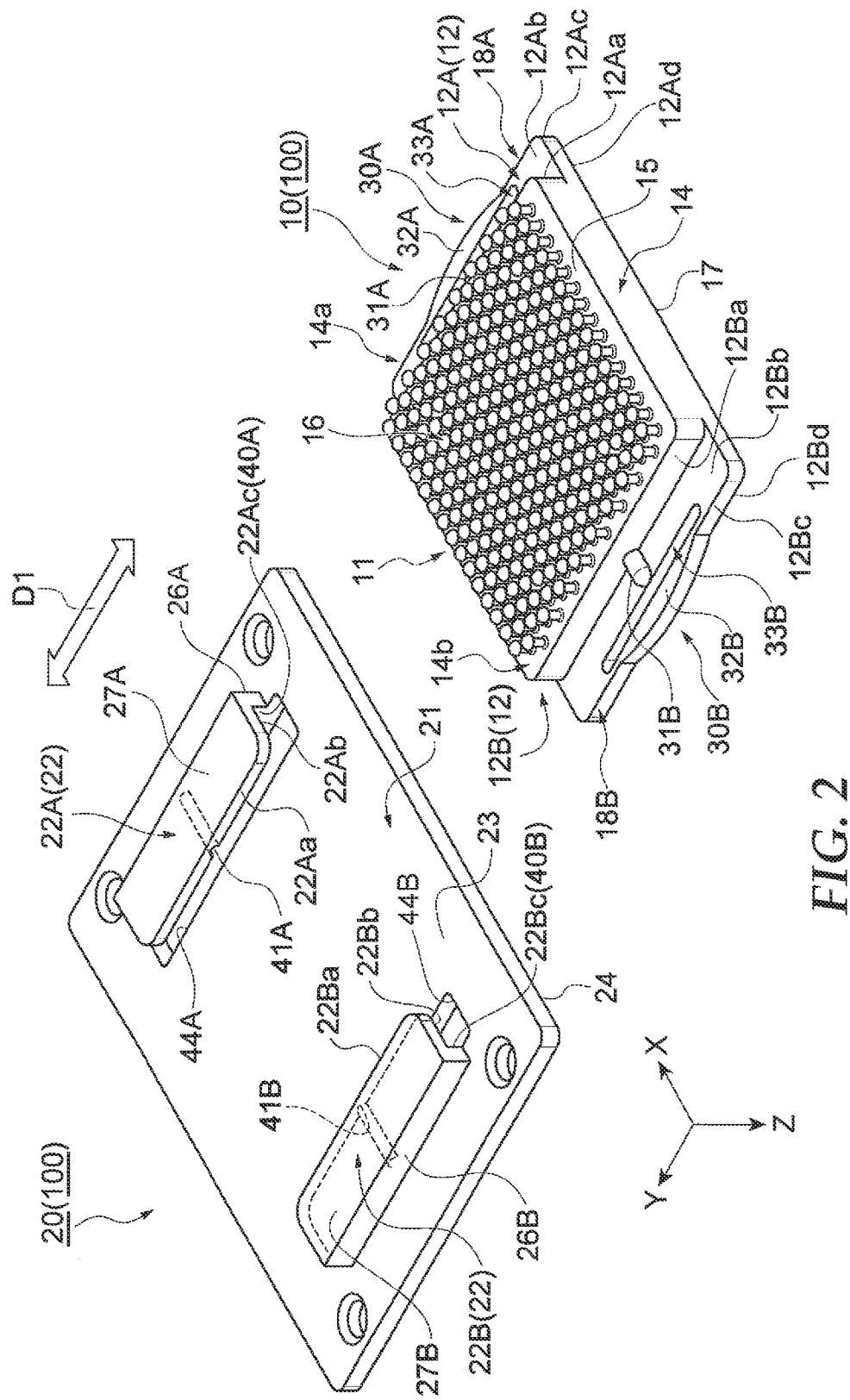
FIG. 2 is a perspective view showing the fastener structure before the fastener member is mounted on the support member.
Figure 3A:
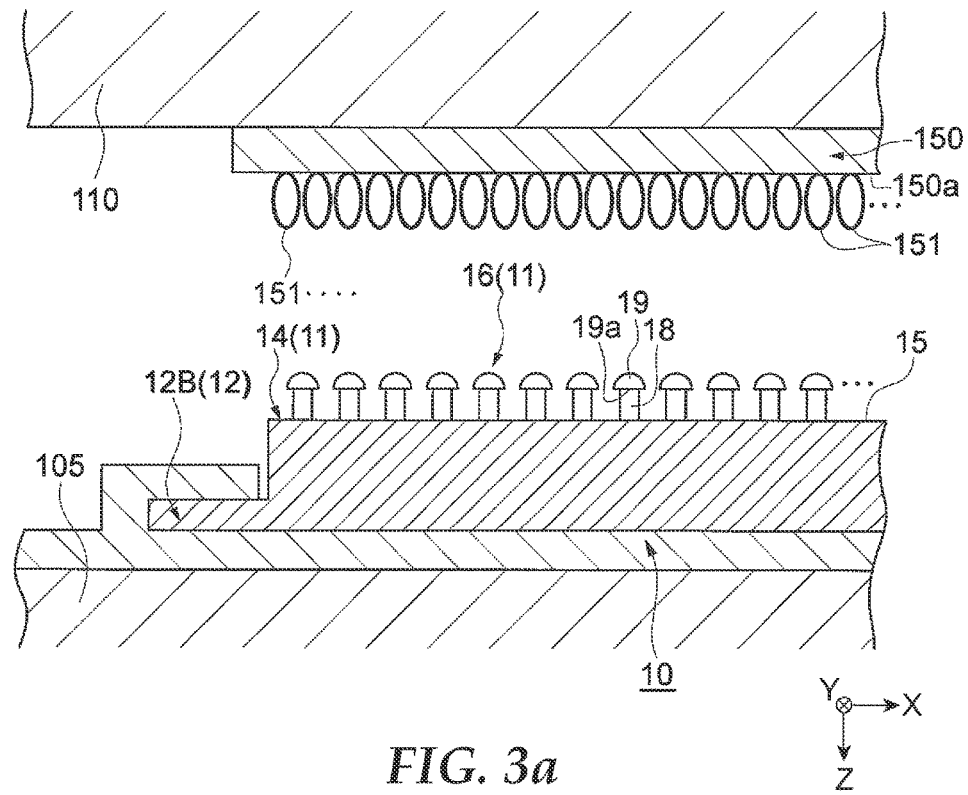
FIG. 3 is a cross-sectional view for explaining coupling using the fastener structure shown in FIG. 1.
Figure 3B:
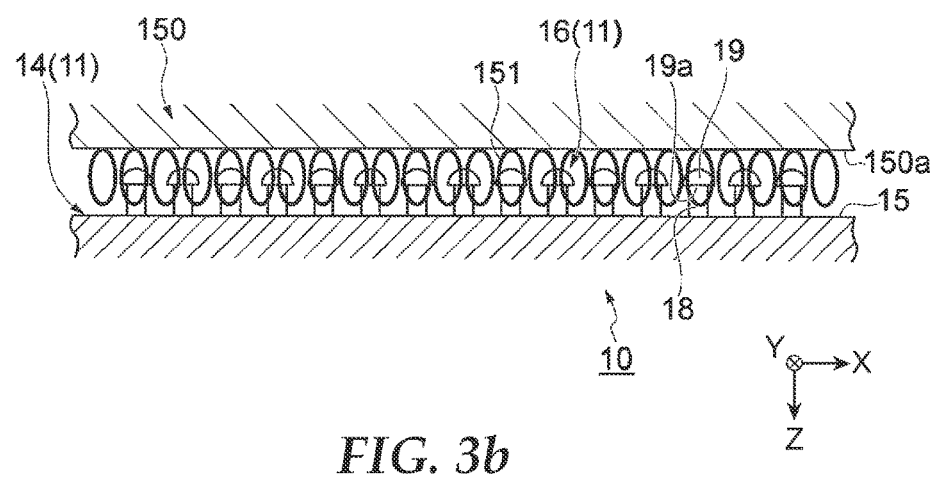

FIG. 1 is a perspective view showing a fastener structure in which a fastener member is mounted on a support member according to one embodiment, and FIG. 2 is a perspective view showing the fastener structure before the fastener member is mounted on the support member. FIG. 3 is a cross-sectional view for explaining coupling using the fastener structure shown in FIG. 1. The fastener structure shown in FIG. 3 is a cross-section at the line III-III in FIG. 1.

As shown in FIGS. 1 to 3, a fastener structure 100 according to the present embodiment is a face-to-face locking type surface fastener used for, for example, fixing vehicle interior finishing material or vehicle interior ceilings, or the like. The fastener structure 100 includes a fastener member 10, and a support member (bracket) 20 on which the fastener member 10 is mounted. Here the fastener member 10 of the fastener structure 100 is used as a hook member that is mechanically coupled to a loop member 150 which is the counter side of coupling. The support member 20 of the fastener structure 100 supports the fastener member 10, and is used as a member for adjusting the height between members 105, 110. The fastener structure 100 is fixed to an internal panel side member (first member) 105, and the loop member 150 is fixed to a vehicle body side member (second member) 110. In the fastener structure 100, the support member 20 is fixed to the member 105, and the fastener member 10 is fixed to the member 105 via the support member 20. The loop member 150 may be also provided on the vehicle internal finishing material or vehicle interior ceiling, and the fastener structure 100 may be provided on the vehicle body side.

The fastener member 10 corresponds to a male side surface fastener. The fastener member 10 includes a fastener portion 11 that is mechanically coupled to the loop member 150 of the member 110 on the mating side, and a guided portion 12 that is guided in the mounting direction D1 by a guide portion 22 of the support member 20. Also, the fastener portion 11 includes a substrate 14, and an engaging member 16 that is vertically provided on the substrate 14. Also, the support member 20 includes a base 21 that supports the substrate 14 of the fastener member 10, and the guide portion 22 provided on the base 21 that guides the guided portion 12 of the fastener member 10 in the Y direction, in other words in the mounting direction D1.

The substrate 14 of the fastener member 10 has a plate-like shape, and includes a substantially flat planar main surface (front surface) 15. The substrate 14 is formed extending in a planar manner in the XY direction. There is no particular limitation on the shape of the substrate 14, but in the present embodiment the substrate 14 is formed as a rectangular plate-like shape with a pair of sides extending in the X direction and a pair of sides extending in the Y direction.

Figure 11:
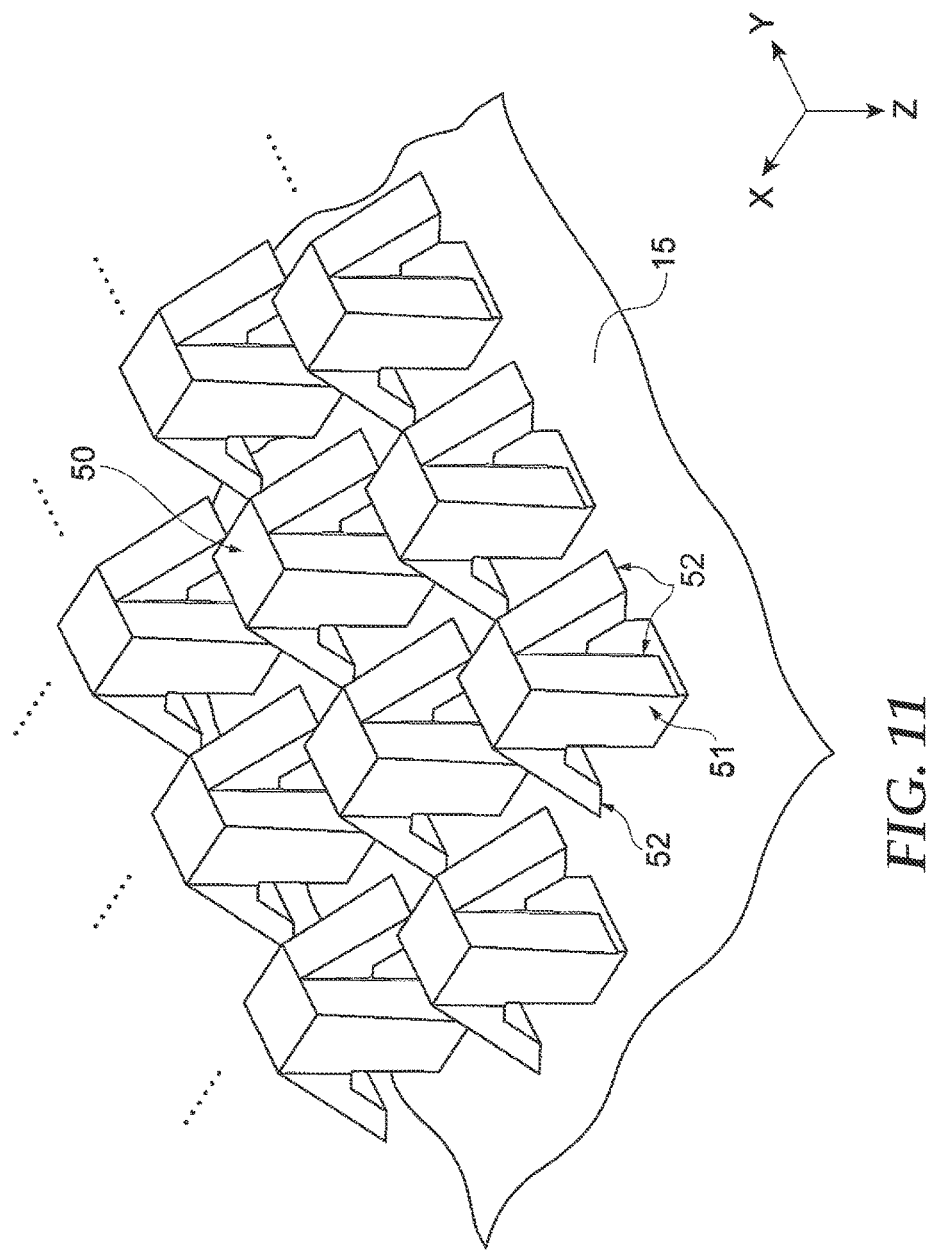
FIG. 11 is a perspective view showing the engaging members according to the modified example.

The engaging member 16 has the function of mechanically coupling the member (first member) 105 to the member (second member) 110. The engaging member 16 is configured from one or more projections vertically provided on the main surface 15 of the substrate 14 and the projections are configured to be engageable with the members on the mating side. One specific aspect of the engaging member 16 can be an upright pillar shaped shaft portion 18 whose shaft direction is the Z direction, and a headed projection 19 provided as a head on the tip of the shaft portion 18 (see FIG. 3), that can be arranged in a lattice-like manner at predetermined intervals viewed from the Z direction (surface view). In this case, the engaging member 16 has a plurality of projections that include a shaft portion 18 and a headed projection 19. There is no particular limitation on the shape of the shaft portion 18, but in the present embodiment it is formed with a circular pillar shape. The headed projection 19 has a pointed conical external shape on the tip, and as a result, on the main surface 15 side on the headed projection 19 a hooking surface 19a for hooking to the loop member 150 is formed. In the present embodiment, the headed projection 19 extends around the whole periphery from the tip side of the shaft portion 18 (extends in all directions). Also, the shape of the headed projection is not limited to a hemispherical shape, for example a headed projection 52 having an arrowhead shape extending in at least two directions from the tip end of a shaft portion 51 as in the engaging member 50 shown in FIG. 11 may be used.

There is no particular limitation on the arrangement pattern of the lattice shape of the engaging member 16. For example, the engaging member 16 may be arranged in a linear row at a constant pitch in the Y direction, and a plurality of these rows can be arranged at a constant pitch in the X direction. At this time, an engaging member 16 of one row may be arranged adjacent to an engaging member 16 in an adjacent row in the X direction (or Y direction). Alternatively, an engaging member 16 of one row and an engaging member 16 in an adjacent row may be arranged in positions that are shifted in the X direction (or Y direction) relative to each other. In other words, the engaging members 16 may be in a staggered manner along the X direction (or the Y direction).

As shown in FIG. 3, the loop member 150 includes a plurality of loop yarns 151 that project from a surface 150a that corresponds to the male side of the surface fastener. When coupled, the loop yarns 151 are engaged with the engaging members 16, and are installed on the surface 150a so that they extend in a ring shape. These loop members 150 are fixed to the member 110 on the vehicle body side of the vehicle, for example, either directly or via a bracket or the like. In the present embodiment, the loop member 150 is exemplified as the mating member of the fastener member 10, but a fastener member with a headed projection may be applied as the mating member. In other words, in this case the structures with a headed projection engage with each other.

In the present embodiment, the engaging members on the surface of the fastener member fixed to the first member side each have a headed projection, and the second member side has a plurality of loops, and the fastener portion mechanically engages with the second member by the headed projections engaging with the loops. However, it is sufficient if the fastener portion and the second member are mechanically engaged, and the form of the mechanical engagement is not limited to the form in the present embodiment. For example, in an aspect in which the engaging member has a projection-like structure and holes are provided in the second member, a case in which the projection structure is engaged around the projection structure can be considered. Also, the engaging member of the fastener portion shown in FIG. 1 has a configuration in which the plurality of projections is vertically provided, but the engaging member may be configured from a single projection structure only (or configured from a projection structure provided in a plurality of positions).

As shown in FIGS. 1 and 2, guided portions 12a, 12b are provided on edge portions 14a, 14b that extend in the Y direction and are opposite each other in the X direction (in other words, the mounting direction D1), from among the four edges of the substrate 14. The guided portions 12a, 12b are configured by providing plate-like flanges 18A, 18B projecting towards the outside in a direction that a surface 15 extends (here, to the outside in the X direction) from the edge portions 14a, 14b. The flanges 18A, 18B extend along the Y direction, in other words, along the mounting direction D1, and in the present embodiment are formed along the total length of the edge portions 14a, 14b of the substrate 14 in the Y direction. However, the flanges 18A, 18B may be shorter than the edge portions 14a, 14b. There is no particular limitation on the amount of projection of the flanges 18A, 18B (size in the X direction) provided the size is sufficient to enable the fastener member 10 to be supported by the guide portions 22A, 22B. There is also no particular limitation on the thickness of the flanges 18A, 18B (size in the Z direction) provided the size is sufficient to enable the fastener member 10 to be supported by the guide portions 22A, 22B, and it may be smaller than the thickness of the substrate 14, or it may be equal to the thickness of the substrate 14. If the flanges 18A, 18B are smaller than the thickness of the substrate 14, the flanges 18A, 18B are formed on the bottom end of end surfaces 12Aa, 12Ba of the edge portions 14a, 14b of the substrate 14. The bottom surfaces 12Ad, 12Bd of the flanges 18A, 18B coincide with the bottom surface 17 of the substrate 14. In this way the flanges 18A, 18B are arranged to form a step with respect to the surface 15 of the substrate 14. If the thickness of the flanges 18A, 18B is smaller than the thickness of the substrate 14 as described above, the guided portions 12A, 12B are configured to include the end surfaces 12Aa, 12Ba of the substrate 14, top surfaces 12Ab, 12Bb of the flanges 18A, 18B, end surfaces 12Ac, 12Bc of the flanges 18A, 18B, and bottom surfaces 12Ad, 12Bd of the flanges 18A, 18B. On the other hand, if the thickness of the flanges 18A, 18B is equal to that of the substrate 14, no step is formed, so the guided portions 12A, 12B are configured to include the top surfaces 12Ab, 12Bb of the flanges 18A, 18B, the end surfaces 12Ac, 12Bc of the flanges 18A, 18B, and the bottom surfaces 12Ad, 12Bd of the flanges 18A, 18B.

The base 21 of the support member 20 is a plate-like member whose size in the X direction and the Y direction is at least larger than that of the fastener member 10. In the present embodiment, the base 21 has a rectangular shape, but there is no particular limitation on the shape. The base 21 supports the fastener member 10 at the top surface 23, and at the bottom surface 24 side is either directly or indirectly fixed to the member 105. There is no particular limitation on the method of fixing the base 21 to the member 105, and various methods such as adhesive, pressure-sensitive adhesive, screws, and so on may be adopted.

The guide portions 22A, 22B extend in the Y direction on the top surface 23 of the base 21 so that they are opposite each other in the X direction (in other words, they extend in the mounting D1 direction), and are formed as claw portions with an L-shaped cross-section. The guide portions 22A, 22B include side wall portions 26A, 26B that extend in the Z direction (upward) from the top surface 23 of the base 21, and top wall portions 27A, 27B that extend inward in the X direction from the top ends of the side wall portions 26A, 26B. The side wall portions 26A, 26B and the top wall portions 27A, 27B extend in the Y direction, in other words the mounting direction D1. In the present embodiment the size of the guide portions 22A, 22B in the Y direction is set smaller than that of the fastener member 10, but there is no particular limitation on the size provided the fastener member 10 can be supported. The dimensional relationship between the guide portions 22A, 22B and the guided portions 12A, 12B is such that when the fastener member 10 is mounted on the support member 20, there is a small gap between the inside surfaces of the guide portions 22A, 22B and the surfaces of the guided portions 12A, 12B. In other words, the end surfaces 22Aa, 22Ba of the top wall portions 27A, 27B of the guide portions 22A, 22B are arranged in positions that are separated from the end surfaces 12Aa, 12Ba of the guided portions 12a, 12b with a small gap therebetween. The bottom surfaces 22Ab, 22Bb of the top wall portions 27A, 27B of the guide portions 22A, 22B are arranged in positions that are separated from the top surfaces 12Ab, 12Bb of the guided portions 12A, 12B with a small gap therebetween. The inner side surfaces 22Ac, 22Bc of the side wall portions 26A, 26B of the guide portions 22A, 22B are arranged in positions that are separated from the end surfaces 12Ac, 12Bc of the guided portions 12A, 12B with a small gap therebetween. Through holes 44A, 44B are formed in the base 21 in positions corresponding to the guide portions 22A, 22B. The through holes 44A, 44B are formed for inserting a mold for forming the top wall portions 27A, 27B of the guide portion when forming.

As shown in FIG. 2, in the fastener structure 100 according to the present embodiment, elastically deforming portions 30A, 30B that can deform elastically are formed in the guided portions 12A, 12B of the fastener member 10. Also, protruding portions 31A, 31B are formed on the guided portions 12A, 12B. Also, receiving portions 40A, 40B that receive the elastic force from the elastically deforming portions 30A, 30B are formed on the guide portions 22A, 22B of the support member 20. In the present embodiment, the inner side surfaces 22Ac, 22Bc of the side wall portions 26A, 26B of the guide portions 22A, 22B correspond to the receiving portions 40A, 40B. Also, projection receiving portions 41A, 41B that receive the protruding portions 31A, 31B are formed on the guide portions 22A, 22B.

The elastically deforming portions 30A, 30B are configured so that they can elastically deform in the X direction which is a direction that intersects (here it is normal) with the mounting direction D1. The elastically deforming portions 30A, 30B include outward extending portions 32A, 32B that extend projecting to the outside in the X direction (a direction in which the surface 15 extends) from the edges in the Y direction, in other words the mounting direction D1, of the flanges 18A, 18B of the guided portions 12A, 12B. Also, the elastically deforming portions 30A, 30B include deformation accommodating portions 33A, 33B that allow the outward extending portions 32A, 32B to deform to the inside in the X direction by forming a space that extends in the mounting direction D1 on the inside in the X direction from the outward extending portions 32A, 32B.

As shown in FIG. 4A, the outward extending portions 32A, 32B project in a circular arc to the outside from the end surfaces 12Ac, 12Bc of the flanges 18A, 18B. There is no particular limitation on the shape of the outward extending portions 32A, 32B, but by projecting outward in a circular arc shape, it is possible to insert the guided portions 12A, 12B into the guide portions 22A, 22B without catching. The amount of projection of the outward extending portion 32A, in other words the dimension L1 between the end surfaces 12Ac, 12Bc and a top portion 32a of the outward extending portions 32A, 32B, is set larger than the dimension L2 (see FIG. 4B) between the end surfaces 12Ac, 12Bc and the inner side surfaces 22Ac, 22Bc when the guided portions 12A, 12B have been inserted into the guide portions 22A, 22B. However, when the outward extending portions 32A, 32B have been deformed to the inside by elastic deformation, a sufficient elastic force is applied to the inner side surfaces 22Ac, 22Bc, that is set to a sufficient magnitude so that there is no catching on the guide portions 22A, 22B.

The deformation accommodating portions 33A, 33B are configured by forming elongated circular through holes 34A, 34B that extend in the mounting direction D1 at the base portion of the outward extending portions 32A, 32B. The through holes 34A, 34B are formed over a range that is wider than that of the outward extending portions 32A, 32B in the mounting direction D1. Therefore, the deformation accommodating portions 33A, 33B include thin portions 36A, 36B that support the outward extending portions 32A, 32B at both ends in the mounting direction D1. As a result of this configuration, when the guided portions 12A, 12B are inserted into the guide portions 22A, 22B, the top portion 32a of the outward extending portions 32A, 32B contact the inner side surfaces 22Ac, 22Bc which are the receiving portions 40A, 40B, as shown in FIG. 4B. As a result the thin portions 36A, 36B and the outward extending portions 32A, 32B elastically deform to the inside in the opposite direction to the projecting direction of the deformation accommodating portions 33A, 33B. Also, the outward extending portions 32A, 32B of the elastically deforming portions 30A, 30B apply an elastic force to the side surfaces 22Ac, 22Bc which are the receiving portions 40A, 40B. In this way, the fastener member 10 is supported within the guide portions 22A, 22B of the support member 20 without any rattling.

FIG. 5 shows a cross-sectional view of the protruding portions 31A, 31B and the projection receiving portions 41A, 41B. As shown in FIG. 5, the protruding portions 31A, 31B project in a direction that intersects (in this case is normal to) the mounting direction, or the upward direction (Z direction). In the present embodiment, the protruding portions 31A, 31B project from the top surfaces 12Ab, 12Bb of the flanges 18A, 18B, and have a semi-circular cross-section extending in the X direction (see FIG. 2). The projection receiving portions 41A, 41B are depressed in a direction that intersects (in this case is normal to) the mounting direction, or the upwards direction (Z direction). In the present embodiment, the projection receiving portions 41A, 41B are depressed upwards from the bottom surfaces 22Ab, 22Bb of the top wall portions 27A, 27B, extending in the X direction (see FIG. 2) with a size that corresponds to the protruding portions 31A, 31B and have a semi-circular cross-sectional shape. There is no particular limitation on the amount of projection of the protruding portions 31A, 31B (in other words, the amount of depression of the projection receiving portions 41A, 41B, provided the size is large enough so that the fastener member 10 can be sufficiently supported, and they do not catch the guide portions 22A, 22B.

Figures 5A, 5B:
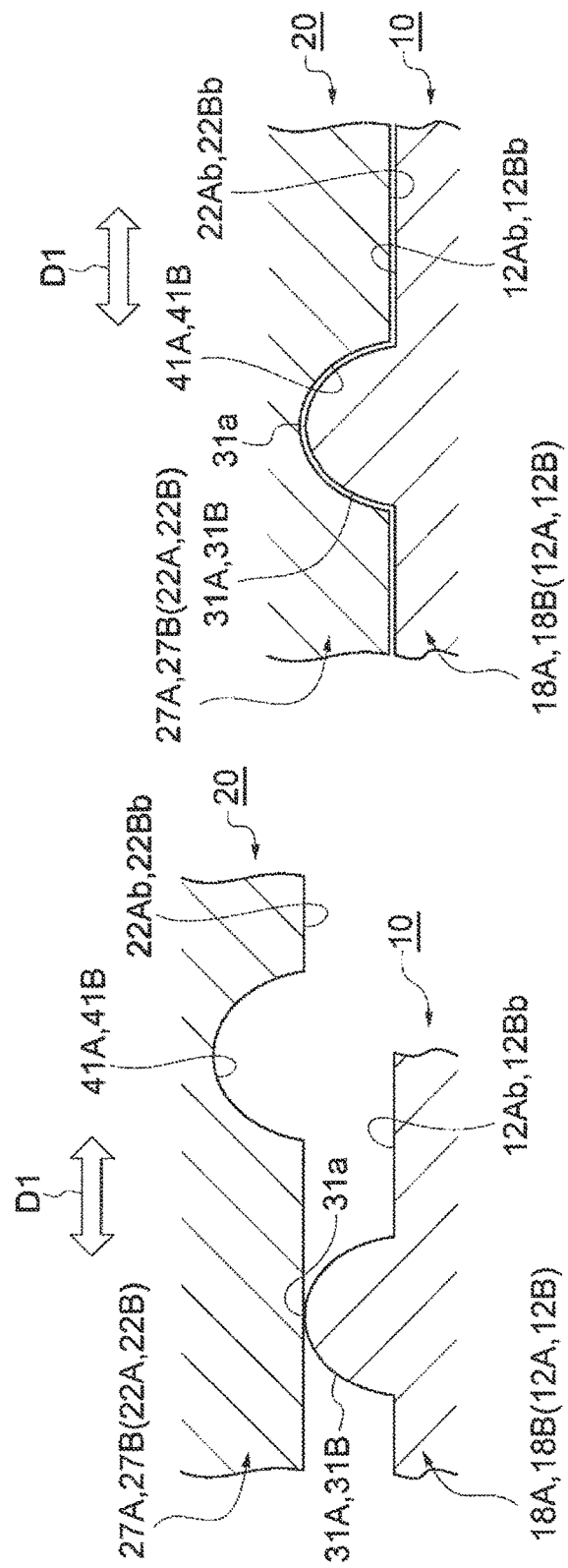
FIG. 5 is a transverse section through a protruding portion and a projection receiving portion.

As shown in FIG. 5A, when the guided portions 12A, 12B are inserted into the guide portions 22A, 22B, the top portion 31a of the protruding portions 31A, 31B contact the bottom surfaces 22Ab, 22Bb. At this time, the gap between the top wall portions 27A, 27B and the flanges 18A, 18B becomes slightly larger. Next, when the protruding portions 31A, 31B reach the position of the projection receiving portions 41A, 41B, the protruding portions 31A, 31B become housed in the projection receiving portions 41A, 41B, as shown in FIG. 5B. In this way the movement of the fastener member 10 in the mounting direction D1 is restricted.

Next, the action and effect of the fastener member 10, support member 20, and fastener structure 100 according to the present embodiment are described.

Figure 6:
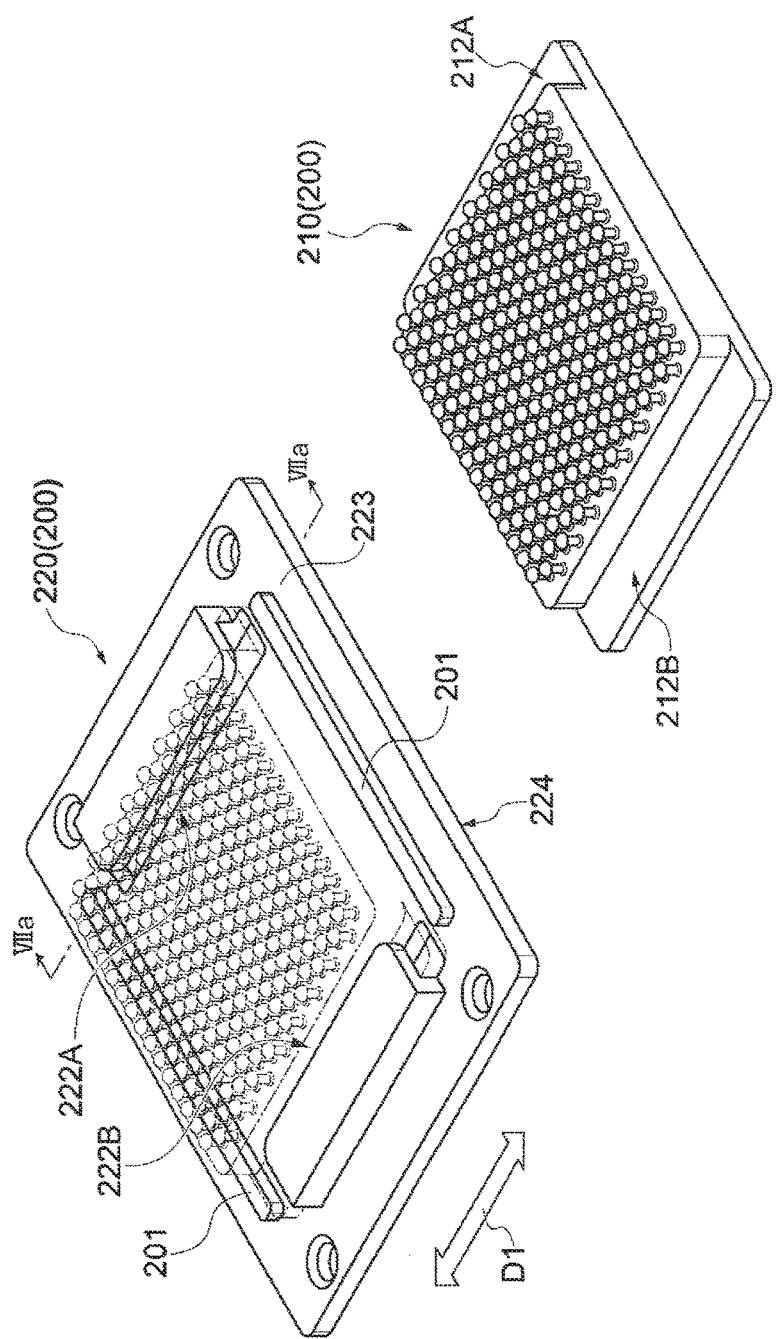
FIG. 6 is a perspective view of a fastener structure according to a comparative example.

Referring to FIGS. 6 and 7, the configuration of a fastener structure 200 according to a Comparative Example will be described. FIG. 6 is a perspective view of the fastener structure 200 according to the Comparative Example. FIG. 7 shows a fastener member 210 according to the Comparative Example being mounted on a support member 220. In FIG. 7, the support member 220 is shown in a cross-sectional view along the line VIIa-VIIa in FIG. 6. The fastener member 210 of the fastener structure 200 has a configuration that is generally the same as the fastener member 10 according to the present embodiment, except that it does not have the elastically deforming portions 30A, 30B on guided members 212A, 212B, and does not have the protruding portions 31A, 31B. Also, the support member 220 of the fastener structure 200 has a configuration that is generally the same as the support member 20 according to the present embodiment, except that guide portions 222A, 222B do not function as receiving portions 40A, 40B, there are no projection receiving portions 41A, 41B, and a base 224 includes a stopper 201 on a top surface 223. The stopper 201 is formed on the front side of the entrance of the guide portions 222A, 222B on the top surface 223 of the base 224. A pair of stoppers 201 is provided at both ends in the mounting direction D1 of the guide portions 222A, 222B opposite each other in the mounting direction D1. As a result of the stoppers 201, the movement of the fastener member 210 mounted in the support member 220 in the mounting direction D1 is restricted.

As shown in FIG. 7A, when mounting the fastener member 210 on the support member 220, it is necessary to insert the fastener member 210 into the guide portions 222A, 222B while it is above the stopper 201. Therefore, it is necessary for the operator to mount the fastener member 210 so as to avoid the stopper 201. Also, as shown in FIGS. 7B and 7C, the tip portion of the fastener member 210 may catch on the edge of through holes 244A, 244B of the base 224. Also, after mounting, movement of the fastener member 210 is restricted in the mounting direction D1 by the stoppers 201, and movement in the other directions is restricted by the guide portions 222A, 222B. A small gap is formed between the fastener member 210 and the guide portions 222A, 222B and the stoppers 201, so there is the problem that play is produced between the fastener member 210 and the support member 220. Also, as a result of this play, the problem occurs that noise and so on is produced by vibrations during use. On the other hand, if the gap between the fastener member 210 and the guide portions 222A, 222B is too small, it becomes difficult to mount the fastener member 210 on the support member 220, which causes the problem of reduction in the operability of assembly.

On the other hand, when the fastener structure 100, fastener member 10, and support member 20 according to the present embodiment is used, the following action and effect are produced. Namely, the fastener member 10 is provided with the edge portions 14a, 14b of the substrate 14, and includes the guided portions 12A, 12B that are guided in the mounting direction D1 by the guide portions 22A, 22B when mounting on the support member 20. The elastically deforming portions 30A, 30B that can elastically deform in a direction that intersects the mounting direction D1 (in the present embodiment the direction of projection is the X direction) are formed on the guided portions 12A, 12B. Therefore, to mount the fastener member 10 on the support member 20, when the guided portions 12A, 12B of the fastener member 10 are guided by the guide portions 22A, 22B of the support member 20, the elastically deforming portions 30A, 30B formed on the guided portions 12A, 12B contact the guide portions 22A, 22B of the support member 20, so they can elastically deform in a direction that intersects with the mounting direction D1. When mounting the fastener member 10, the elastically deforming portions 30A, 30B deform elastically, so it is possible to easily assemble them without interference between the guide portions 22A, 22B and the guided portions 12A, 12B. On the other hand, after the fastener member 10 is mounted, the fastener member 10 is supported without play by the guide portions 22A, 22B of the support member 20 due to the elastic force generated between the elastically deforming portions 30A, 30B and the receiving portions 40A, 40B. As a result of the above, it is possible to reduce play and suppress noise without reducing the ease of assembly. In addition, when the elastically deforming portions 30A, 30B are formed projecting in the X direction as in the present embodiment, it is possible to suppress vibrations in the X direction. Vibrations in the Y direction and the Z direction can be suppressed by the protruding portions 31A, 31B. In other words, it is possible to provide a fastener structure 100 with higher performance that can suppress vibrations in the three axial directions.

Also, in the fastener member 10 according to the present embodiment, the protruding portions 31A, 31B are formed on the guided portions 12A, 12B projecting in a direction that intersects with the mounting direction D1 (in the present embodiment, the negative Z direction). Also, in the support member 20, the projection receiving portions 41A, 41B are formed in the guide portions 22A, 22B, depressed in a direction that intersects with the mounting direction D1 (the same direction as the direction that the protruding portions 31A, 31B project, in the present embodiment the negative Z direction). As a result of this construction, the protruding portions 31A, 31B are accommodated in the projection receiving portions 41A, 41B, so it is possible to restrict the movement in the mounting direction D1 of the fastener member 10 after mounting. Also, the protruding portions 31A, 31B and the projection receiving portions 41A, 41B are provided on the guided portions 12A, 12B and the guide portions 22A, 22B, in other words provided on the edge portions 14a, 14b side extending along the mounting direction D1, so it is not necessary to provide the stopper 201 as shown in FIG. 6 in the area on the front side of the entrance to the guide portions 22A, 22B of the top surface 23 of the base 21 of the support member 20, and it is possible to form it in a planar manner. As a result, when mounting the fastener member 10 on the support member 20, there is no interference with a member such as the stopper 201 shown in FIG. 6, and it is possible to smoothly insert the guided portions 12A, 12B of the fastener member 10 along the top surface 23 of the planar base 21 into the guide portions 22A, 22B of the support member 20.

Also, in the fastener member 10 according to the present embodiment, the elastically deforming portions 30A, 30B include the outward extending portions 32A, 32B that extend along the edges in the mounting direction D1 of the guided portions 12A, 12B, and the deformation accommodating portions 33A, 33B that allow deformation of the outward extending portions 32A, 32B to the inside by forming a space extending in the mounting direction D1 to the inside of the outward extending portions 32A, 32B. As a result of this configuration, when the outward extending portions 32A, 32B contact the receiving portions 40A, 40B, the outward extending portions 32A, 32B can deform into the space of the deformation accommodating portions 33A, 33B. As a result of the above, the elastically deforming portions 30A, 30B can reliably generate elastic force, with a simple configuration.

The present invention is not limited to the embodiment as described above. For example, instead of the structure in which the fastener member has the elastically deforming portions and the support member has the receiving portions, the support member may have the elastically deforming portions and the fastener member may have the receiving portions. Also, instead of the structure in which the fastener member has the protruding portions and the support member has the projection receiving portion, the support member may have the protruding portions and the fastener member may have the projection receiving portions.

For example, a fastener structure 300 as shown in FIG. 8 may be adopted. As shown in FIG. 8, elastically deforming portions 330A, 330B and protruding portions 331A, 331B are formed on guide portions 322A, 322B of the support member 320 of the fastener structure 300. Also, receiving portions 340A, 340B and projection receiving portions 341A, 341B are formed on guided portions 312A, 312B of a fastener member 310 of the fastener structure 300. The elastically deforming portions 330A, 330B are formed on the tip portion of the top wall of the guide portions 322A, 322B. Also, the end surface of the base portion of the fastener member 310 functions as the receiving portions 340A, 340B. The protruding portions 331A, 331B are formed on the bottom surface of the top wall of the guide portions 322A, 322B. Also, the projection receiving portions 341A, 341B are formed on the top surface of the flanges of the guided portions 312A, 312B.

Also, the configuration of the elastically deforming portion is not limited to the configuration as described above, and various constructions may be adopted provided it is possible to generate elastic force in a direction that intersects with the mounting direction D1. For example, elastically deforming portions 430A, 430B as in a fastener member 410 shown in FIG. 9A may be adopted. Deformation accommodating portions 433A, 433B of the elastically deforming portions 430A, 430B allow deformation of extending portions 432A, 432B to the inside by forming a space with cutouts 434A, 434B extending in the mounting direction D1. The cutouts 434A, 434B extend in the mounting direction D1 from the back end side of guided portions 412A, 412B (when the direction of insertion into the support member is the "front") (in other words. the negative Y direction), with an opening on the back end side. The extending portions 432A, 432B extend with the edge extending in the mounting direction D1 projecting to the outside.

Also, the elastically deforming portion according to the embodiment described above can deform in the X direction, but any configuration may be used provided that it can deform in a direction that intersects with the mounting direction D1. For example, elastically deforming portions 530A, 530B as in a fastener member 510 shown in FIG. 9B may be adopted. The elastically deforming portions 530A, 530B can elastically deform in the Z direction. Specifically, extending portions 532A, 532B extend in the negative Z direction (upward in the drawing) in the mounting direction D1 of guided portions 512A, 512B. A through hole 534 extending in the mounting direction D1 is formed on the inside in the X direction of the extending portions 532A, 532B. Also, deformation of the extending portions 532A, 532B in the positive Z direction is allowed by forming a space by a groove 535 on the inside in the Z direction of the extending portions 532A, 532B (in a position on the positive Z direction side of the extending portions 532A, 532B). If this sort of elastically deforming portions 530A, 530B are adopted, the bottom surface of the top wall of the guide portions of the support member functions as a receiving portion.

Elastically deforming portions as shown in FIG. 9 may be provided on the guide portion side of the support member.

The support member according to the embodiment as described above is configured as a small component, and this support member is fixed to the structure of a vehicle or the like. Alternately the support member may be configured from the structure of the vehicle itself. For example, a structure 620 of a vehicle as shown in FIG. 10 can be made to function as the support member of a fastener structure by providing a base 631 and guide portions 622A and 622B on a portion of the structure 620 so that a fastener member can be mounted. By adopting such a configuration, it is possible to omit the operation of fixing the support member to the structure of the vehicle.

What is claimed is:

1. A fastener member that is mechanically coupled to a second member that can be mounted on a first member, and that is fixed to the first member via a support member, the fastener member comprising:
   a fastener portion that includes a substrate that includes a surface extending along a mounting direction when mounted on the support member, and an engaging member vertically provided on the surface, and that is mechanically coupled to the second member by engaging the engaging member with the second member; and
   a guided portion provided on the edge portion of the substrate, that is guided in the mounting direction;
   wherein an elastically deforming portion that can elastically deform in a direction that intersects with the mounting direction in a plane parallel to the substrate is formed on the guided member.

2. The fastener member according to claim 1, wherein a protruding portion that projects in a direction that intersects with the mounting direction or a projection receiving portion that is depressed in a direction that intersects with the mounting direction is formed in the guided member.

3. The fastener member according to claim 2, wherein the elastically deforming portion comprises:
   an extending portion that extends along an edge that extends in the mounting direction of the guided member; and
   a deformation accommodating portion that allows deformation of the extending portion to the inside by forming a space on the inside of the extending portion that extends in the mounting direction.

4. The fastener member according to claim 3, wherein the surface of the substrate extends along a mounting direction in which the fastener member is mounted on the support member.

5. The fastener member according to claim 2, wherein the surface of the substrate extends along a mounting direction in which the fastener member is mounted on the support member.

6. The fastener member according to claim 1, wherein the surface of the substrate extends along a mounting direction in which the fastener member is mounted on the support member.

7. A fastener member that is mechanically coupled to a second member that can be mounted on a first member, and that is fixed to the first member via a support member, the fastener member comprising:
   a fastener portion that includes a substrate that includes a surface extending along a mounting direction when mounted on the support member, and an engaging member vertically provided on the surface, and that is mechanically coupled to the second member by engaging the engaging member with the second member; and
   a guided portion provided on the edge portion of the substrate, that is guided in the mounting direction;
   wherein an elastically deforming portion that can elastically deform in a direction that intersects with the mounting direction is formed on the guided member, wherein the elastically deforming portion comprises:
   an extending portion that extends along an edge that extends in the mounting direction of the guided member; and
   a deformation accommodating portion that allows deformation of the extending portion to the inside by forming a space on the inside of the extending portion that extends in the mounting direction.

8. The fastener member according to claim 7, wherein the space is a through hole or cutout between the substrate and on the inside of the extending portion that extends in the mounting direction.

9. The fastener member according to claim 8, wherein the surface of the substrate extends along a mounting direction in which the fastener member is mounted on the support member.

10. The fastener member according to claim 7, wherein the surface of the substrate extends along a mounting direction in which the fastener member is mounted on the support member.

11. A fastener structure comprising:
a fastener member that is mechanically coupled to a second member that can be mounted on a first member; and
a support member on which the fastener member can be mounted, and that is fixed to the first member;
the fastener member comprising:
a fastener portion that includes a substrate that includes a surface extending along a mounting direction when mounted on the support member, and an engaging member vertically provided on the surface, and that is mechanically coupled to the second member by engaging the engaging member with the second member; and
a guided portion provided on the edge portion of the substrate, that is guided in the mounting direction; and
the support member comprising:
a base that supports the substrate of the fastener member; and
a guide portion provided on the base, that guides the guided portion of the fastener member in the mounting direction, wherein:
an elastically deforming portion that can elastically deform in a direction that intersects with the mounting direction is formed on the guided portion, and a receiving portion that receives elastic force from the elastically deforming portion is formed on the guide portion; or
an elastically deforming portion that can elastically deform in a direction that intersects with the mounting direction is formed on the guide portion, and a receiving portion that receives elastic force from the elastically deforming portion is formed on the guided portion.

12. The fastener structure according to claim 11, wherein:
a protruding portion that projects in a direction that intersects with the mounting direction is formed in the guided portion; and
a projection receiving portion that accommodates the protruding portion is formed in the guide portion as a depression in a direction that intersects with the mounting direction; or
a protruding portion that projects in a direction that intersects with the mounting direction is formed in the guide portion, and a projection receiving portion that accommodates the protruding portion as a depression in a direction that intersects with the mounting direction is formed in the guided portion.

13. The fastener structure according to claim 12, wherein the support member is configured from a vehicle structure.

14. The fastener member according to claim 13, wherein the surface of the substrate extends along a mounting direction in which the fastener member is mounted on the support member, and the guided portion is guided in the mounting direction, when mounted on the support member.

15. The fastener member according to claim 12, wherein the surface of the substrate extends along a mounting direction in which the fastener member is mounted on the support member, and the guided portion is guided in the mounting direction, when mounted on the support member.

16. The fastener structure according to claim 11, wherein the support member is configured from a vehicle structure.

17. The fastener member according to claim 16, wherein the surface of the substrate extends along a mounting direction in which the fastener member is mounted on the support member, and the guided portion is guided in the mounting direction, when mounted on the support member.

18. The fastener member according to claim 11, wherein the surface of the substrate extends along a mounting direction in which the fastener member is mounted on the support member, and the guided portion is guided in the mounting direction, when mounted on the support member.

19. A support member on which is fixed a fastener member that is mechanically coupled to a second member that can be mounted on a first member, and that is fixed to the first member, comprising:
a base that supports the fastener member;
a guide portion provided on the base, that guides the fastener member in the mounting direction; and
an elastically deforming portion that can elastically deform in a direction that intersects with the mounting direction being formed on the guide portion.

20. The support member according to claim 19, wherein the guide portion comprises a projection protruding toward the base.

* * * * *